(12) United States Patent
Nammi et al.

(10) Patent No.: US 8,320,967 B2
(45) Date of Patent: Nov. 27, 2012

(54) USER LOCATION BASED SWITCHING BETWEEN DIVERSITY AND MULTIPLEXING

(75) Inventors: Sairamesh Nammi, Dallas, TX (US); Narendra Tilwani, Addison, TX (US); Venkata Alapati, Frisco, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 12/967,967

(22) Filed: Dec. 14, 2010

(65) Prior Publication Data

US 2012/0149416 A1    Jun. 14, 2012

(51) Int. Cl.
*H04B 1/38*    (2006.01)

(52) U.S. Cl. ........ 455/561; 455/436; 455/450; 455/451; 455/456.1; 370/328; 370/329; 370/331; 370/341

(58) Field of Classification Search ............ 5/13.3–13.4; 455/15, 436–451, 452.1–452.2, 453, 456.1–456.4, 455/464, 509; 370/328–329, 331, 395.41, 370/341, 314, 499, 532–534
See application file for complete search history.

(56) References Cited

U.S. PATENT DOCUMENTS

| | | | |
|---|---|---|---|
| 2005/0281189 A1* | 12/2005 | Lee et al. | 370/208 |
| 2006/0182063 A1* | 8/2006 | Ma et al. | 370/331 |
| 2007/0153756 A1* | 7/2007 | Kobayashi et al. | 370/338 |
| 2009/0190488 A1 | 7/2009 | Hochwald et al. | |
| 2010/0267338 A1* | 10/2010 | Chiu et al. | 455/63.1 |

FOREIGN PATENT DOCUMENTS

EP    1 715 600 A1    10/2006

* cited by examiner

*Primary Examiner* — Wayne Cai

(57) ABSTRACT

Multiple antennas at the transmitter and receiver increase the capacity in a wireless communication system. Received signal quality can be enhanced through diversity by transmitting the same symbol on multiple antennas. Data rate can be increased through multiplexing by transmitting different symbols on the transmitting antennas. Operating in one particular mode only is generally not suitable. Choosing diversity or multiplexing by taking into account the location of a user can enhance both throughput and reliability.

18 Claims, 10 Drawing Sheets

USER LOCATION BASED SWITCHING BETWEEN DIVERSITY AND MULTIPLEXING

TECHNICAL FIELD

Technical field of present disclosure relates to method, apparatus and system for switching between multiplexing and diversity, and in particular to switching between diversity and multiplexing based on a location of the user.

BACKGROUND

Multiple antennas at the transmitter and receiver increases the capacity in a wireless communication system. By transmitting the same symbol on the transmit antennas, the received signal quality can be increased due the diversity gain. On the other hand, by transmitting different symbols on the transmitting antennas, the data rate of the system can be increased due to multiplexing. In general, one particular mode is not always suitable in a wireless system. Thus, it is often a good practice to switch between diversity and multiplexing.

Conventionally, there are various methods to which to use diversity or multiplexing at any given moment. For example, expected spectral efficiency and/or capacity can be computed at the base station from pilot measurements for each individual communication mode—diversity, adaptation, or multiplexing. Based on the computed efficiency/capacity, it can be decided whether to use diversity or multiplexing.

However, a problem associated with the conventional method is that simply computing the efficiency/capacity at the base station does not fully take into account the environmental conditions that can affect the wireless communication between a UE and the base station.

SUMMARY

A non-limiting aspect of the disclosed subject matter is directed to a method to communicate between a base station and a user equipment of a wireless communication system. The method may be performed at a base station capable of transmitting over multiple antennas. In the method, it is determined whether the user equipment is located within a threshold edge distance from an edge of a cell corresponding to the base station. When the user equipment is determined to be located within the threshold edge distance, diversity is chosen.

Another non-limiting aspect of the disclosed subject matter is directed to a base station of a wireless communication system arranged to wirelessly communicate with a user equipment. The base station is capable of transmitting over multiple antennas. The base station includes a communication unit, a UE location determination unit, and a communication mode determination unit. The communication unit is configured to communicate with the user equipment, the UE location determination unit is configured to determine whether the user equipment is located within a threshold edge distance from an edge of a cell corresponding to the base station, and the communication mode determination unit is configured to choose diversity for transmission from the base station to the user equipment when the user equipment is determined to be located within the threshold edge distance.

DESCRIPTION OF THE DRAWINGS

The foregoing and other objects features, and advantages of the disclosed subject matter will be apparent from the following more particular description of preferred embodiments as illustrated in the accompanying drawings in which reference characters refer to the same parts throughout the various views. The drawings are not necessarily to scale.

DETAILED DESCRIPTION

For purposes of explanation and not limitation, specific details are set forth such as particular architectures, interfaces, techniques, and so on. However, it will be apparent to those skilled in the art that the technology described herein may be practiced in other embodiments that depart from these specific details. That is, those skilled in the art will be able to devise various arrangements which, although not explicitly described or shown herein, embody the principles of the described technology.

In some instances, detailed descriptions of well-known devices, circuits, and methods are omitted so as not to obscure the description with unnecessary details. All statements herein reciting principles, aspects, embodiments and examples are intended to encompass both structural and functional equivalents. Additionally, it is intended that such equivalents include both currently known equivalents as well as equivalents developed in the future, i.e., any elements developed that perform same function, regardless of structure.

Thus, for example, it will be appreciated that block diagrams herein can represent conceptual views of illustrative circuitry embodying principles of the technology. Similarly, it will be appreciated that any flow charts, state transition diagrams, pseudo code, and the like represent various processes which may be substantially represented in computer readable medium and executed by a computer or processor, whether or not such computer or processor is explicitly shown.

Functions of various elements including functional blocks labeled or described as "processors" or "controllers" may be provided through dedicated hardware as well as hardware capable of executing associated software. When provided by a processor, functions may be provided by a single dedicated processor, by a single shared processor, or by a plurality of individual processors, some of which may be shared or distributed. Moreover, explicit use of term "processor" or "controller" should not be construed to refer exclusively to hardware capable of executing software, and may include, without limitation, digital signal processor (shortened to "DSP") hardware, read only memory (shortened to "ROM") for storing software, random access memory (shortened to RAM), and non-volatile storage.

In this document, 3GPP is primarily used as examples for explanation purposes. However, the scope of this disclosure is not limited to the set of 3GPP wireless network systems and can encompass many domains of wireless network systems.

As noted in the background section, a problem with the existing method to switch between diversity and multiplexing is that the environmental conditions that can affect the wireless communication between a UE and a base station (BS). For example, it is generally known that noises and interferences impact the quality of the radio link between a BS and a UE.

Figure 1:
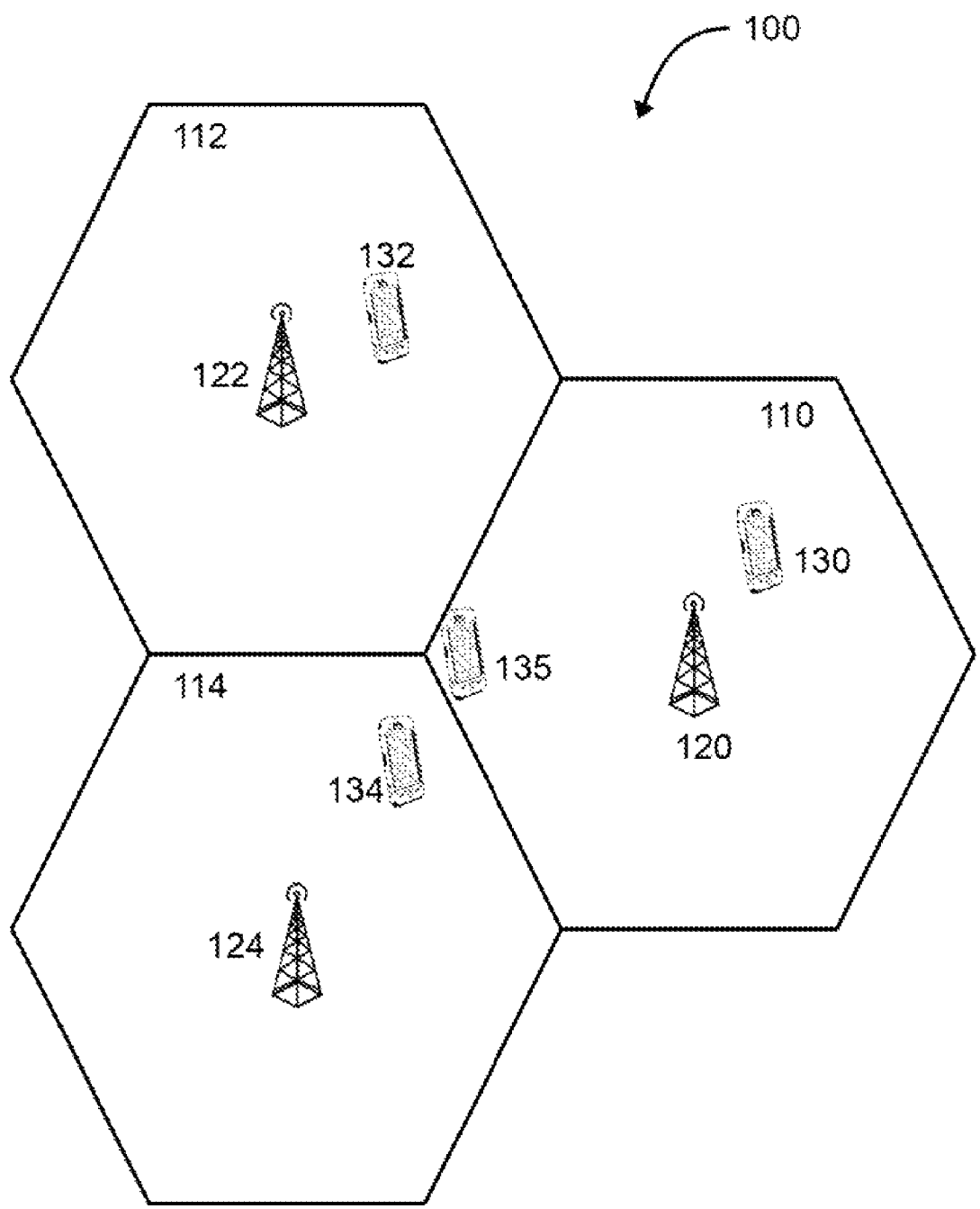
FIG. 1 illustrates an example of a wireless communication system layout with base station, corresponding cells, and user equipments.

To serve as an explanation, FIG. 1, which illustrates a layout of an example wireless communication system 100, is provided. For simplicity of explanation, many of the elements and functions a typical wireless communication system are not illustrated. For example, elements such as the core network nodes, home location registers, gateways, and so on are not illustrated so as to minimize clutter. The figures in this disclosure are exemplary and should not be taken to be limiting.

As seen in FIG. 1, the system 100 includes multiple BSs 120, 122, 124 serving corresponding coverage areas or cells 110, 112, 114. UEs 130, 135 are within cell 110, and thus it can be assumed that the BS 120 is the serving BS for UEs 130, 135. Similarly, it can be assumed that BSs 122, 124 are the respective serving BSs for UEs 132, 134. For the moment, focus will be on the BS 120 and the UEs 130, 135 it serves bearing in mind that the discussions that follow will likely apply with equal validity to the BSs 122, 124 as well as to the UEs 132, 134.

As mentioned above, noises and interferences impact the quality of the radio link between the BS and the UE. In FIG. 1, the UE 130 is illustrated to be located close to its serving BS 120. Thus, the radio link between the BS 120 and the UE 130 is likely to be of good quality. That is, the signal-to-interference-and-noise ratio (SINR) of this radio link is likely to be high.

UE 135 on the other hand is illustrated to be located fairly close to the edge of cell 110, i.e., close to the limits of the coverage area of BS 120. As such, the radio link between BS 120 and UE 135 is likely to suffer from noises. For example, where UE 135 is located, interferences due to transmissions from neighboring base station 122, 124 may be substantial. The likely result is that the radio link quality, at least in the downlink direction, between BS 120 and UE 135 will be low, e.g., link's SINR will be low. Also, note that due to the proximity of the UE 134 to the UE 135, there may be significant interferences in the uplink direction from the UE 135 to the BS 120 as well.

At the transmitter, e.g., at a BS on the downlink to a UE, using multiplexing will increase the data transmission rate over using diversity generally. This is acceptable when the link quality between the UE and the BS is good. For example, multiplexing may be used as the communication mode between BS 120 and UE 130 in FIG. 1.

Figure 2:
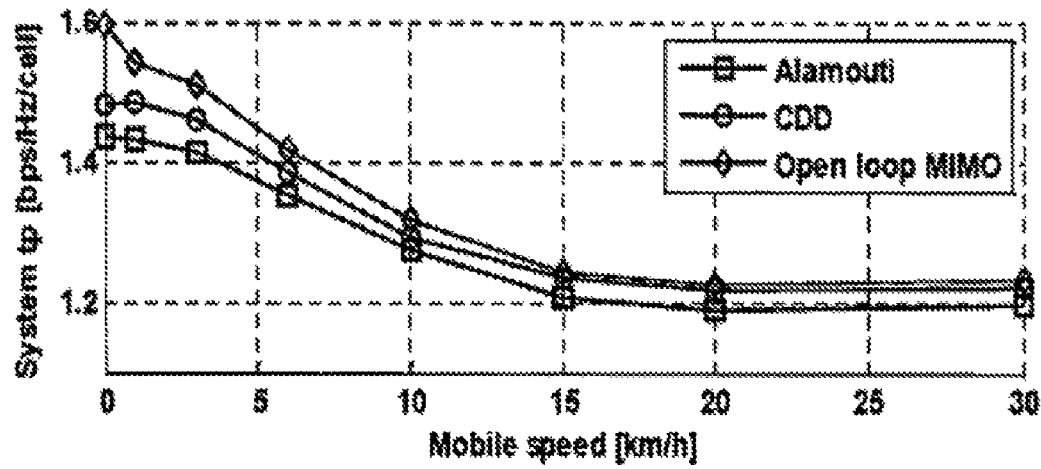
FIG. 2 illustrates a throughput of a cell sector for different modes of communication.

This is consistent with FIG. 2 which illustrates a throughput of a cell sector for different modes of communication—Alamouti, cyclic delay diversity (CDD), and open loop multiple-input multiple-output (MIMO). Alamouti space-time codes are typically used to achieve transmit diversity (rank 1). CDD is also a way to achieve single-rank transmit diversity. Open loop MIMO is generally seen as an adaptive way to achieve transmission ranks greater than one (i.e. multiplexing). Higher the rank, greater the degree of multiplexing, and hence, greater the peak rate.

For a UE located close to a cell center such as the UE 130 in the cell 110, FIG. 2 shows that the adaptation mode results in a better throughput than either of the individual modes. That is, multiplexing results in a better throughput than the single-rank modes. The multiplexing rank can be adapted generally such that as the UE is located closer to the cell center, the transmission rank can be correspondingly increased.

But when there is significant amount of noise and interference on the radio link, the data throughput may actually be better when a lower rank transmission is used. At the extreme, for example at the cell edge, diversity may result in a better overall throughput than multiplexing. As mentioned above, high rank transmissions can achieve high peak rates. However, high rank also results in the coverage being correspondingly reduced. To put in another way, lower rank transmissions result in greater coverage. Thus, at the edge of the cell 110 where the UE 135 is located, rank 1 (diversity) transmissions from the BS 120 will likely be the best in terms of throughput. This is confirmed in FIG. 3 which shows that at the cell edge, diversity has the best throughput performance.

Figure 3:
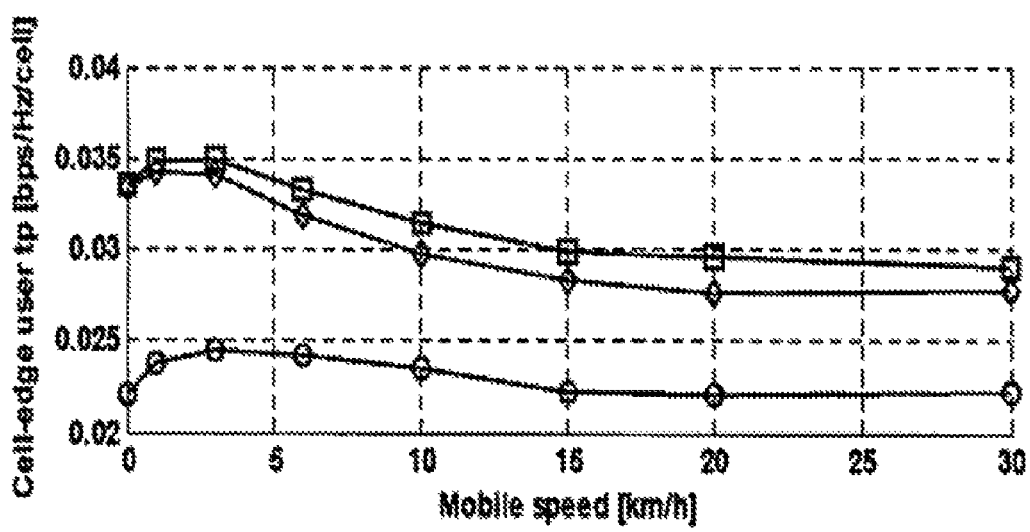
FIG. 3 illustrates a throughput at cell edge for the different modes.

It is seen the location of the user, i.e., the location of the UE, is a significant factor that should be taken into account in choosing the communication mode—diversity (rank=1) or multiplexing (rank>1)—at least to achieve optimum throughput. In the present disclosure, an exemplary scheme is proposed in which the communication mode between a BS and a UE is chosen based on the UE's location. That is, the user location is considered in the proposed scheme. This is unlike the existing method in which the user location is not considered. When the user location is not considered, the cell edge user throughput can be negatively impacted as seen in FIG. 3, which in turn reduces the coverage. The proposed scheme can replace the existing method. It is also contemplated that the proposed scheme can be combined with the existing method.

Figure 4:
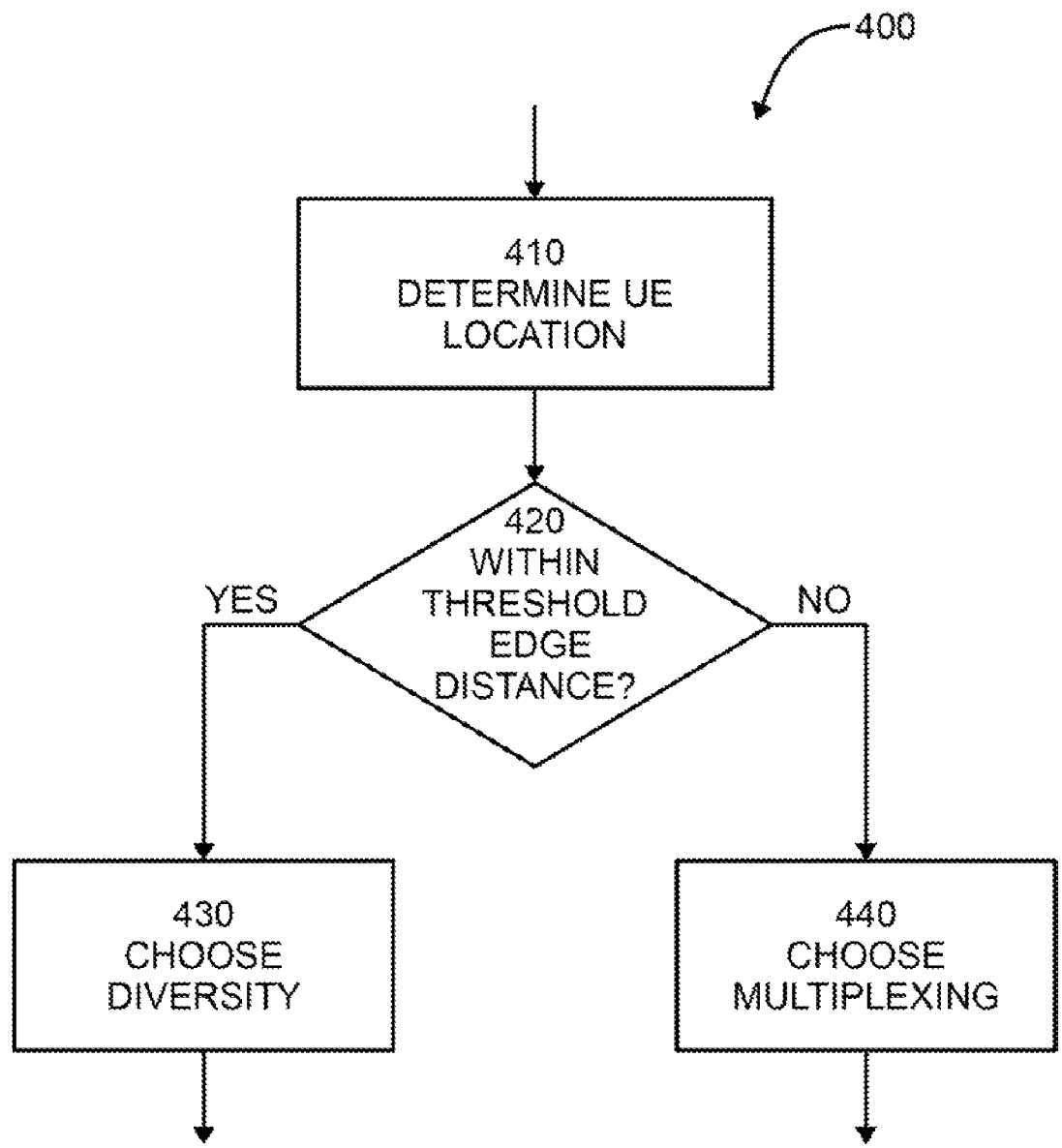
FIG. 4 illustrates a flow chart of an example process for switching between diversity and multiplexing.

FIG. 4 illustrates a flow chart of an example process or method for choosing a communication mode between a base station and a user equipment. The method 400 may be performed at the base station of a wireless communication system, e.g. the BS 120, to wirelessly communicate with the user equipments it serves, e.g. UE 130, 135. It is assumed that the BS 120 is capable of transmitting over multiple antennas, i.e., the BS 120 is capable of performing diversity (rank=1) or multiplexing (rank>1) transmissions.

Note that the communication mode between a base station and one UE can be independent of the communication mode between the same base station and a different UE. For example, diversity mode may be chosen for a radio link between the BS 120 and the UE 135 (referred to as the "first radio link" for ease of reference) while multiplexing may be chosen for a radio link between the BS 120 and the UE 130 (referred to as the "second radio link" also for ease of reference). More generally, the ranks of radio links can be independent of each other. For example, the ranks of both the first and second radio links may indicate multiplexing (rank>1), but differ in the rank level. Thus, the method 400 should be taken as being independently applicable for each BS-UE radio link.

Further, the communication mode is assumed to be dynamic in that the mode can change depending on the circumstances. For example, as the UE 130 moves away from the BS 120, the first radio link's rank can be reduced. Thus, the method 400 should also be taken as being independently applicable for a particular BS-UE radio link at different times.

For simplicity of explanation, the method 400 will be described with reference to the BS 120 and the UE 130. In the method 400, the BS 120 determines the location of the UE 130 (step 410). The BS 120 then determines whether the UE 130 is located within a threshold edge distance from the edge of the cell 110 (step 420). When the BS 120 determines that the UE 130 located within the threshold edge distance, the BS 120 chooses diversity (rank 1) for the first radio link at least for the downlink transmission to the UE 120. Conversely, when the BS 120 determines that the UE 130 not located within the threshold edge distance, the BS 120 chooses multiplexing (rank>1) for the first radio link at least for the downlink transmission.

As seen in FIG. 1, the cell 110 corresponds to the radio coverage area of the BS 120. The threshold edge distance is some distance from the cell's edge in which diversity is enforced. Note that the threshold edge distance can be particular to each cell, i.e., it need not be the same for all cells. For example, the threshold edge distance for a relatively small cell (e.g., corresponding a base station in an urban area) may be small as compared to the distance for a relatively large cell (e.g., corresponding a base station in a rural area).

Even for one cell, the threshold edge distance may change over time. For example, the threshold distance may be set closer to the edge during times of low demand (e.g., during sleeping hours, less interference likely) and set further from the edge during times of high demand (e.g., during business day, more interference likely). The threshold edge distance can be set manually or be set automatically.

Figure 5:
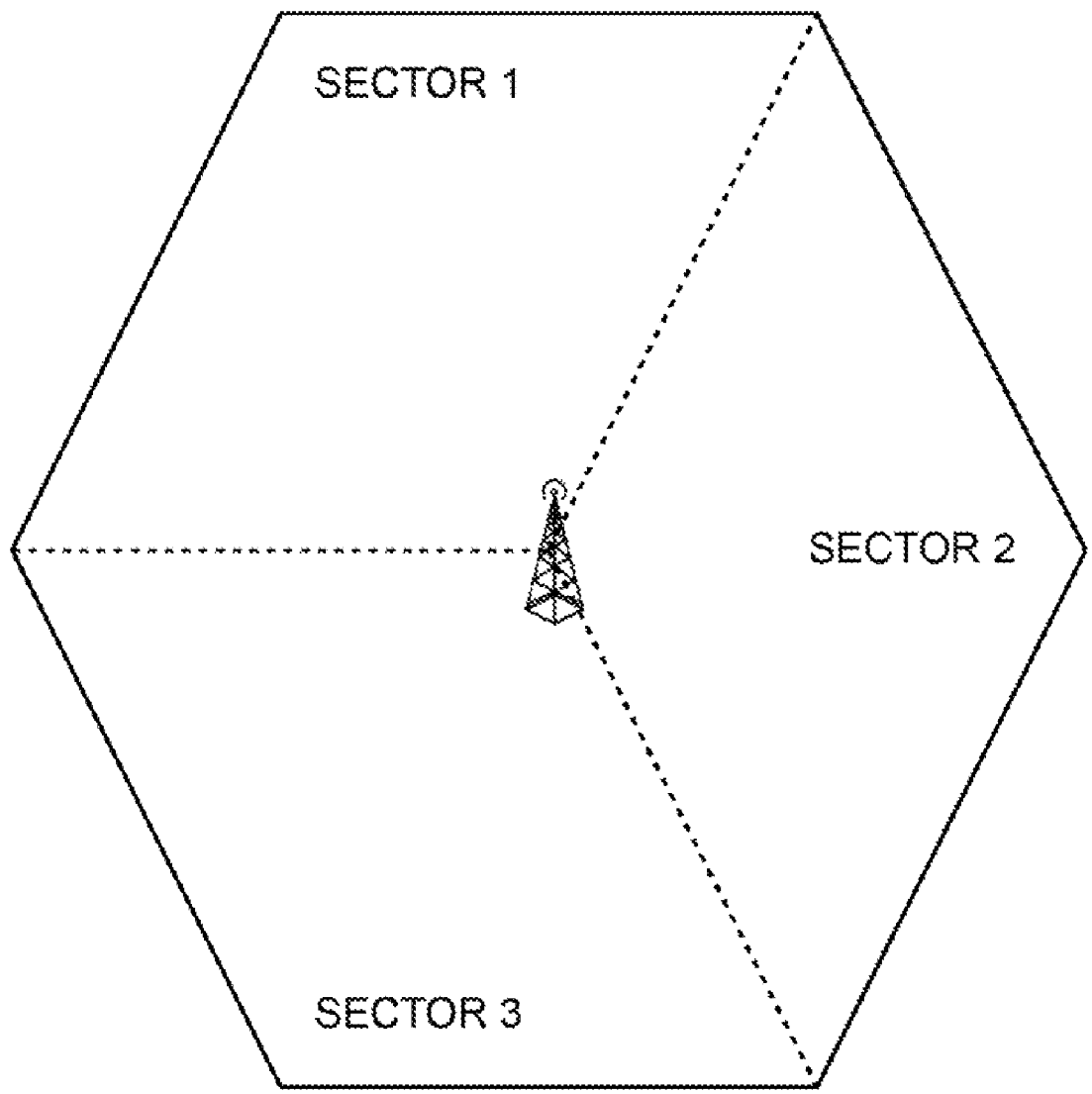
FIG. 5 illustrates an example of a cell divided into sectors.

For the purposes of this disclosure, the term "cell" is to be taken broadly to mean a coverage area. This is explained with to FIG. 5 which illustrates a cell divided into three sectors. For a variety of reasons, it is fairly common to sectorize a cell in which each sector is essentially treated separately even though all sectors are served by the same base station. Thus, in at least one aspect of the present disclosure, each sector can be viewed as a separate "cell", i.e., as a separate coverage area. Thus, the threshold edge distance of sector 1 is not necessarily the same as the threshold edge distance of sector 2 or of sector 3.

Referring back to FIG. 4, the BS 120 determines in step 420 whether or not the UE 130 is within the threshold edge distance (whether or not the UE 130 is close to the edge). If the UE 130 is GPS capable, it may provide its geographical location in a report to the BS 120 from which the BS 120 may make the determination. The geographical location may be determined in other ways such as through triangulation.

Figure 6:
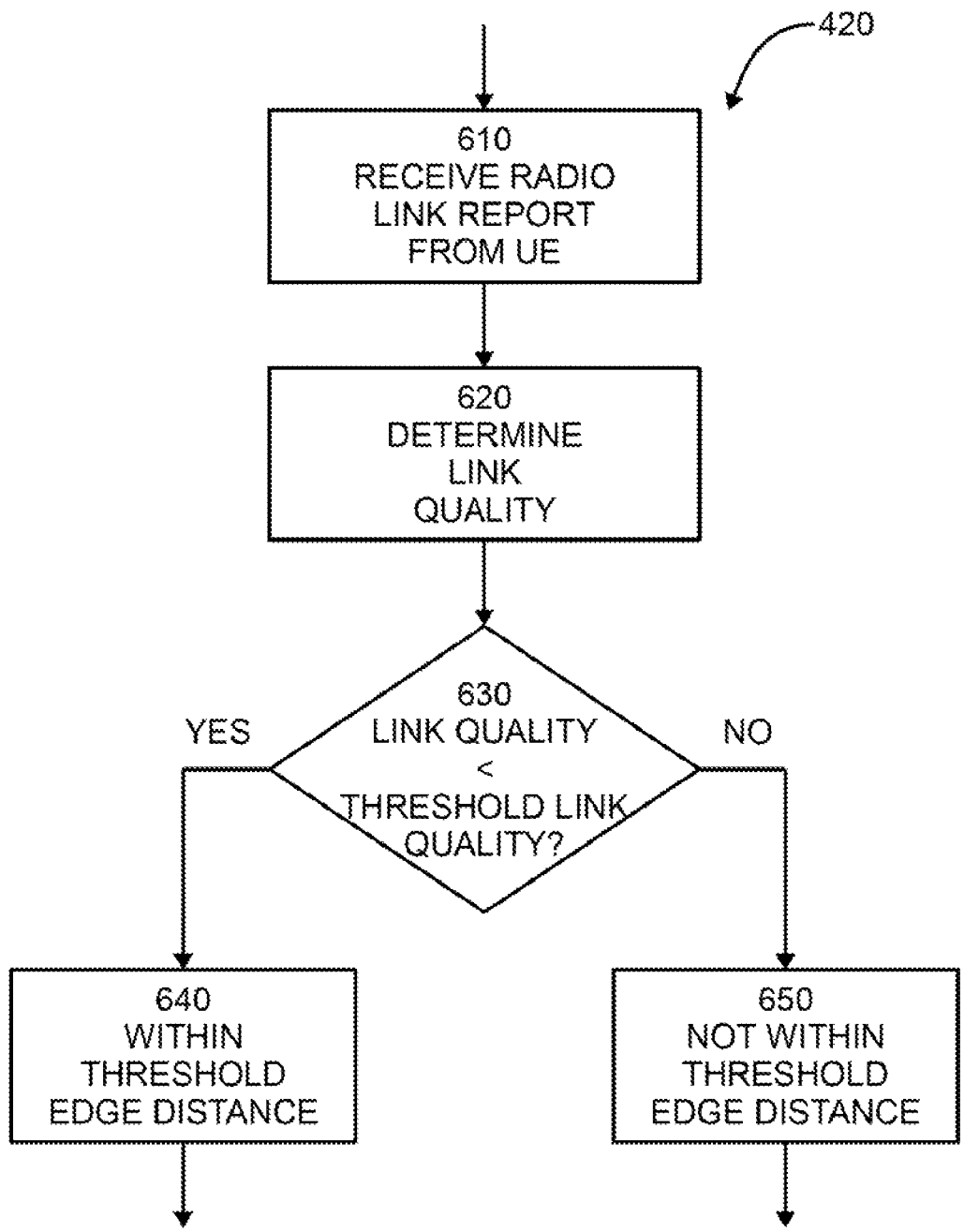
FIG. 6 illustrates a flow chart of an example process for determining whether a user equipment is close to an edge of a cell.

There are also ways in addition to geographical means to determine the UE's location and hence determine whether the UE is within the threshold edge distance. FIG. 6 illustrates one example process in which the step 420 may be implemented. Generally, in the process illustrated in FIG. 6, the quality of the radio link between the BS 120 and the UE 130 is used as a basis to determine whether or not the UE 130 is close to the cell's edge.

As seen in the figure, the BS 120 receives a radio link report from the UE 130 regarding a radio link between the BS 120 and the UE 130 (step 610). Based on the radio link report, the BS 120 determines the link quality of the radio link (step 620). The BS 120 then determines whether the link quality is lower than a threshold link quality (step 630). When the link quality is determined to be is lower than the threshold link quality, the BS 120 determines that the UE 130 is located within the threshold edge distance (step 640). Conversely, when the link quality is not determined to be lower than the threshold link quality, the BS 120 determines that the UE 130 is not located within the threshold edge distance (step 650).

In FIG. 6, the threshold link quality is correlated to the threshold edge distance. Thus, just as the threshold edge distance of one cell is not necessarily dependent on the threshold edge distance another cell, the threshold link qualities of different cells need not be dependent as well. Also just as the threshold edge distance of one cell can by dynamic, the same can be said of the threshold link quality of the cell.

The radio link quality can be expressed in multitudes of ways. The above mentioned SINR is one measure of the link's quality. Others measures include SNR, error rates (bits, frames, packets, etc.), retransmission rates (e.g., related to ARQs), MCS, and even the rank assigned to the UE. The radio link quality can be expressed in any combination of these measures and any other individual quality measures.

In step 630, it is indicated that whether or not the link quality is lower than the threshold link quality is determined. However, it should be noted that the direction of comparison should be adjusted or otherwise accounted for depending on the particular measurement. For example, if an error rate is used; then the inequality in step 630 should be reversed or the reciprocals of the error rate should be used as the link quality measurement.

Figure 7:
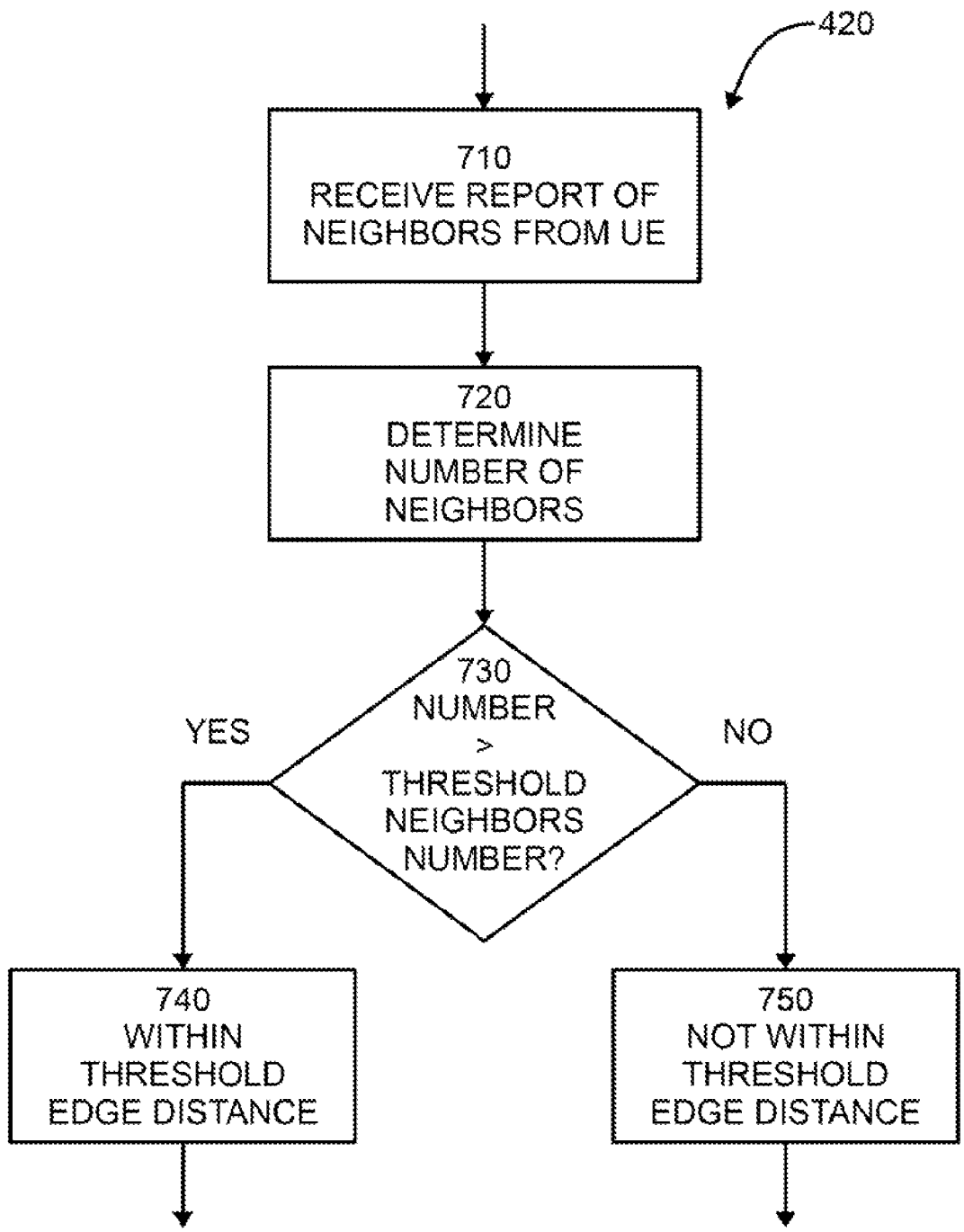
FIG. 7 illustrates a flow chart of another example process for determining whether a user equipment is close to an edge of a cell.

FIG. 7 illustrates another example process for implementing step 420. Like the process illustrated in FIG. 6, the process of FIG. 7 also uses information the UE provides to determine whether or not the UE is located close to the cell edge. In this process, the number of neighboring BSs detected by the UE is used. The logic is as follows. Before a handoff occurs, a UE typically sends a measurement report or multiple of such reports to the serving BS, which indicates that the UE is close to the cell boundary and is likely to handoff to other cells. The measurement report typically contains information about the neighboring base stations, and may also include a measurement of the signal power emanating from the base stations. For example, in 3GPP, the UE can report to the serving eNB the RSRP levels of the neighboring eNBs as seen by the UE. A high number of detected neighboring BSs is an indication that the UE is close to the cell edge.

As seen in the figure, the BS 120 receives a neighbor report from the UE 130 regarding other base stations neighboring the BS 120 (step 710). For example, the neighbor report may include information of the BSs 122 and/or 124. Based on the neighbor report, the BS 120 determines the number of neighboring base stations (step 720). The BS 120 then determines whether the number of neighboring base stations is higher than a threshold neighbors number (step 730). When the number is determined to be is higher than the threshold neighbors number, the BS 120 determines that the UE 130 is located within the threshold edge distance (step 740). Conversely, when the link quality is not determined to be higher than the threshold neighbors number, the BS 120 determines that the UE 130 is not located within the threshold edge distance (step 750).

In FIG. 7, the threshold neighbors number is correlated to the threshold edge distance. Thus, threshold neighbors number of one cell need not be dependent on another cell and can dynamically change.

As indicated above, the neighbor report can also include the power level of the neighboring base stations as detected by the UE. Two different UEs at the same location may detect different number of base stations because one is more sensitive than the other. When this occurs, the neighbor reports from the two UEs may not be similar even though they are similarly located. If the total number of detected neighboring base stations is used for comparison in step 730, the higher sensitive UE may be unnecessarily forced into a lower rank communication mode simply because it is able to detect weak signals that in reality may not be a significant source of interference.

Thus, in one aspect, only those neighboring base stations that contribute to the interference by more than a negligible amount are considered. That is, in one example implementation of step 720, each neighboring base station in the neighbor report whose signal level is higher than a threshold neighbor level is counted towards the number of neighboring base stations and others are ignored. Again, it should be noted that the setting of the threshold neighbor level for at least one base station can be independently set from other base stations, and the level for at least one cell may be adjusted dynamically.

Figure 8:
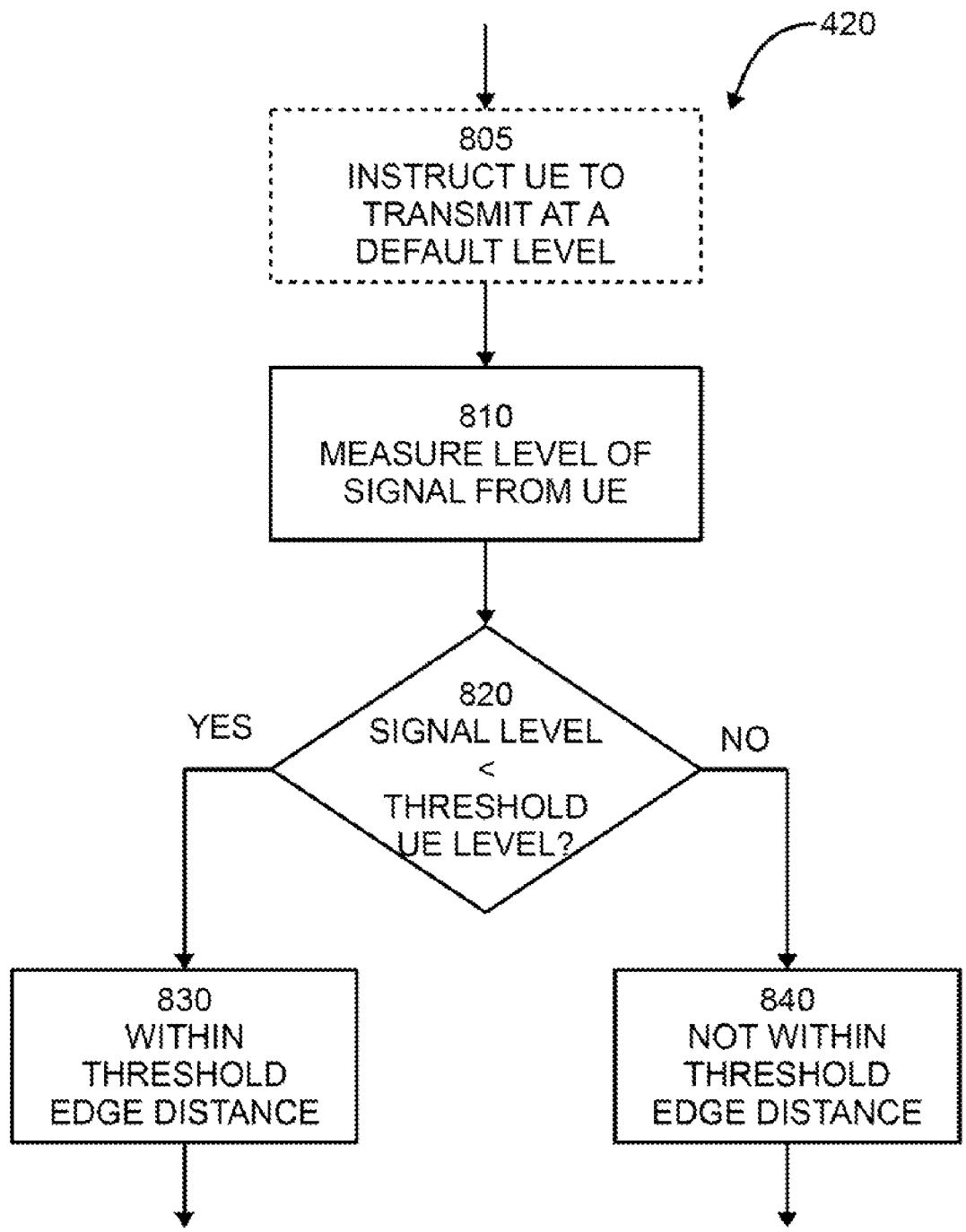
FIG. 8 illustrates a flow chart of yet another example process for determining whether a user equipment is close to an edge of a cell.

FIG. 8 illustrates yet another example process implement step 420. In this process, the signal(s) from the UE is (are) measured at the BS to determine whether or not the UE is close to the cell edge. Generally, weaker signals indicate that the UE is farther away from the BS and consequently closer to the cell edge, and vice versa.

As seen in the figure, the BS 120 measures the UE signal level of the signal transmitted from the UE 130 (step 810), and determines whether or not the UE signal level is below a threshold UE level (step 820). If so, the BS 120 determines that the UE 130 is located within the threshold edge distance (step 840). Otherwise, the BS 120 determines that the UE 130 is not located within the threshold edge distance (step 850). The UE signal that is measured may be the UE's SRS or its pilot signal.

In many wireless communication systems, the base station typically controls the transmission power level of the UEs within its serving area so as to minimize interferences while maintaining some acceptable level of service. Thus, the strength of the measured signal by itself may not be an accurate indication of the UE's location. Thus, in one aspect, the BS 120 can also take into account the level at which the UE 130 transmits since the BS 120 can instruct the UE 130 to transmit at a particular level.

In another aspect, when a UE first enters a cell of a base station, no transmission control has yet taken place, and thus the UE will transmit its pilot signal, e.g., a sounding reference signal (SRS), at a default power level. In this aspect, the signal from the UE 130 may be measured in step 810 prior to the BS 120 instructing the UE 130 to adjust its transmission power, and that measured level may be used for comparison in step 820.

In another aspect, the BS 120 may simply instruct the UE 130 to transmit at a predetermined power level (step 805) prior to measuring the UE signal level in step (810).

Referring back to FIG. 4, when the BS 120 determines that the UE 130 is close to the cell edge, diversity is strictly chosen. On the other when the BS 120 determines that the UE 130 is not that close to the cell edge, multiplexing is strictly chosen. When the UE's location is the main basis for choosing the communication mode, enforcing diversity at the cell edge is logical since FIG. 3 indicates that at the limits of the coverage area, diversity results in a better throughput.

Figure 9:
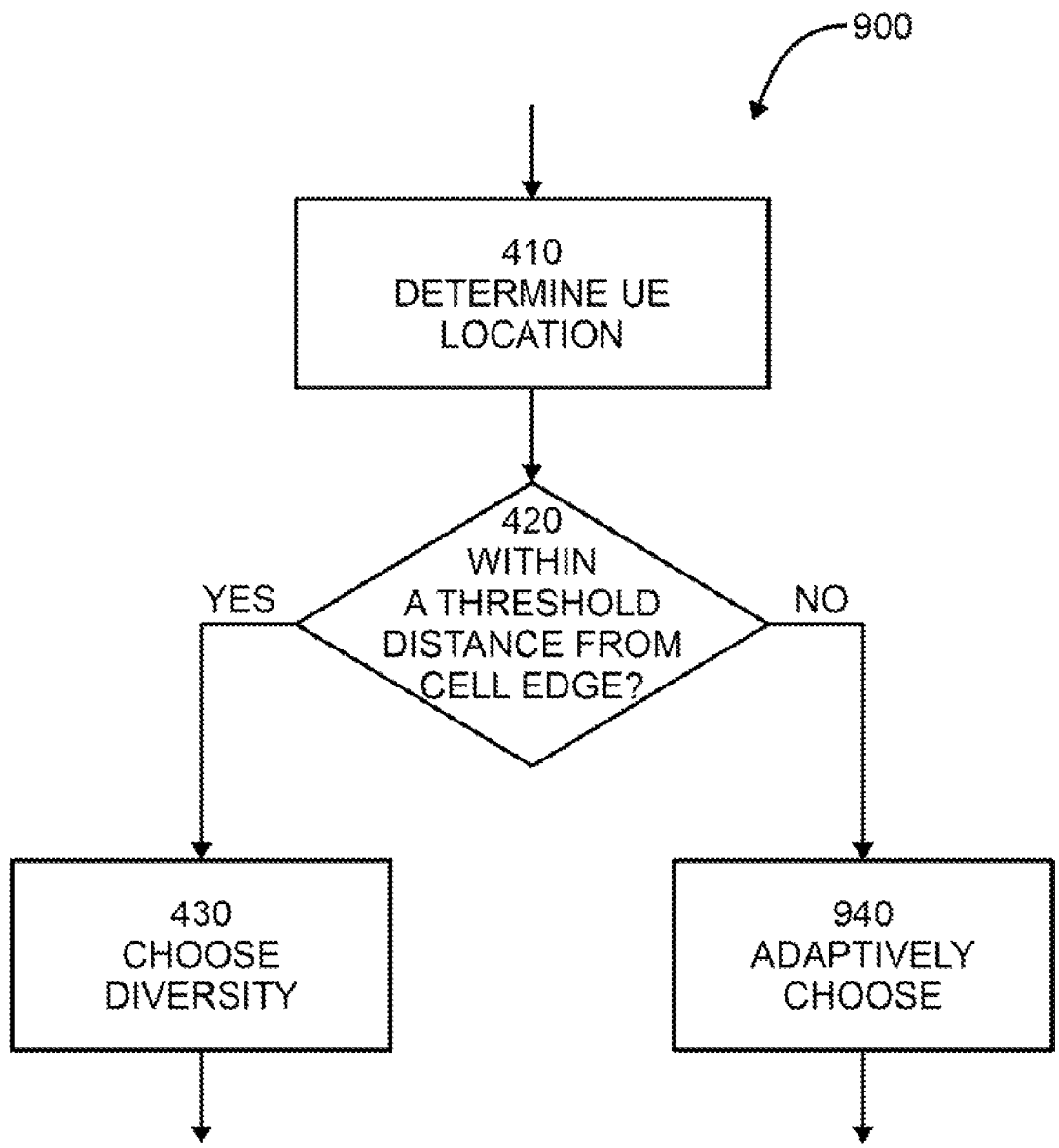
FIG. 9 illustrates a flow chart of another example process for switching between diversity and multiplexing.

But further in from the edge, strictly choosing multiplexing may not always be optimal. This is because the level of interferences can change over time at a given location. Thus, in an alternative, rather than strictly choosing multiplexing when the UE is not near the edge of the cell, the choice between diversity and multiplexing may be made adaptively. This is illustrated in FIG. 9. The method 900 illustrated in FIG. 9 is the same as method 400 of FIG. 4 with the exception of step 940, which is performed when the BS 120 determines that the UE 130 is not close to the edge, e.g., determines that the UE 130 is not within the threshold edge distance. In step 940, the BS 120 adaptively chooses the operation mode.

Figure 10:
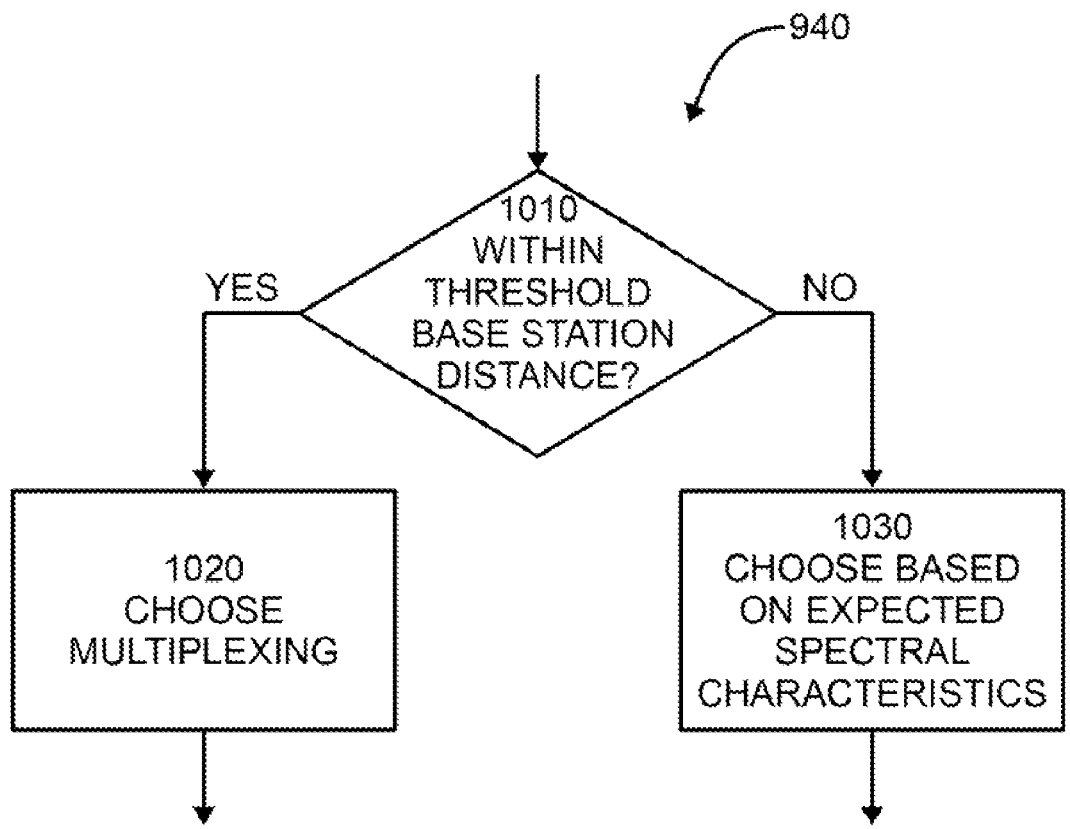
FIG. 10 illustrates a flow chart of an example process for adaptively choosing between diversity and multiplexing.

FIG. 10 illustrates an example process to implement step 940 to adaptively choose between diversity and multiplexing. As illustrated, the BS 120 determines whether the UE 130 is located within a threshold base station distance from the base station 120 (step 1010). If so, the BS 120 chooses multiplexing for transmission from the base station 120 to the UE 130 when the UE 130 is determined to be located within the threshold base station distance (step 1020). Otherwise, the BS 120 chooses one of diversity and multiplexing based on spectral characteristics of a radio link between the BS 120 to the UE 130 (step 1030). Spectral characteristics can be the expected spectral efficiency and/or capacity computed at the base station from pilot measurements for each individual communication mode.

Figure 11:
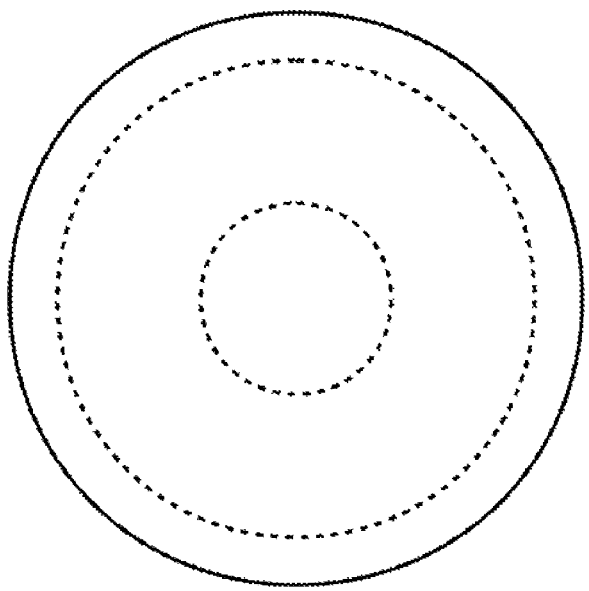
FIG. 11 illustrates a cell divided into different regions.

The logic behind the process illustrated in FIG. 10 is explained with reference to FIG. 11 which illustrates a cell represented by the large solid circle. To minimize clutter, the corresponding base is not shown, but it is assumed that the base station is centrally located. In FIG. 11, three regions are shown—the center region enclosed by smaller dashed circle, edge region defined between the outer solid circle and the larger dashed circle, and an intermediate region between the two dashed circles.

The cell edge region may be viewed as a region in which diversity (rank=1) is strictly chosen. As mentioned above, the interference level can change over time. Thus, it is possible that the interference, even within the cell edge region, will be low enough at some point so that multiplexing can be utilized. However, the cell edge region can be viewed as a region in which diversity is assumed to achieve the best throughput is sufficiently accurate such that incurring the cost of determining the spectral characteristics for choosing the best mode is not warranted. At the other extreme, there can be a region close to the center in which simply assuming that multiplexing can be used is sufficiently accurate such that the cost of determining the spectral characteristics need not be incurred. This is the center region in FIG. 11. But in intermediate region, the interference changes affect whether diversity or multiplexing can be used to a degree such that simply assuming one or the other will not be sufficiently accurate.

Thus, the cell edge region may be viewed to correspond to the YES branch in step 420 of FIGS. 4 and 9, the center region may be viewed to correspond to the YES branch in step 1010 in FIG. 10, and the intermediate region may be viewed to correspond to the NO branch in step 1010 in FIG. 10.

In the center region, multiplexing is chosen, i.e., the rank is at least two in this region. While not shown, it should be realized that the center region can be even more finely subdivided into minimum rank 2 region, minimum rank 3 region, and so on.

Figure 12:
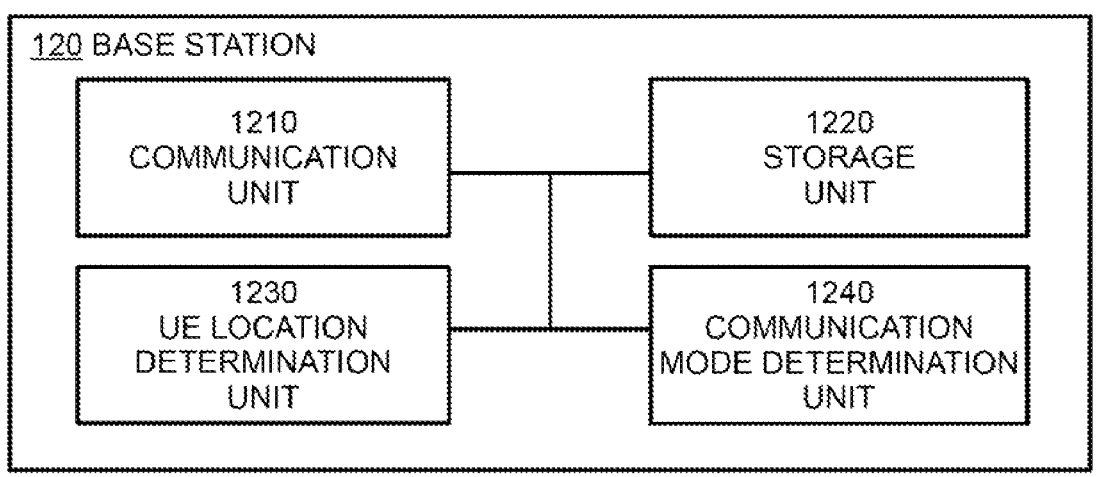
FIG. 12 illustrates an example embodiment of a base station.

FIG. 12 illustrates an example arrangement of a base station such as the BS 120. As seen, the BS 120 may include a communication unit 1210, a UE location determination unit 1230, and a communication mode determination unit 1240. FIG. 12 provides a logical view of the BS 120, and thus, some or all units may be separate or may be combined physically in an integrated module. Also, the some or all units may be implemented through a combination of hardware, software, and firmware. The BS 120 may include one or more processing units executing program instructions stored in a storage unit 1220 to perform the functions of any one or more the units 1210, 1230, and 1240. The program instructions may be provided through a non-transitory storage medium or in programmed in firmware.

The roles performed by the different units of the BS 120 correspond to the methods and processes described above, and thus will not be repeated here.

Although the description above contains many specificities, these should not be construed as limiting the scope of the disclosed subject matter but as merely providing illustrations of some of the presently preferred embodiments. Therefore, it will be appreciated that the scope of the disclosed subject matter fully encompasses other embodiments which may become obvious to those skilled in the art, and that the scope is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby.

What is claimed is:

1. A method performed at a base station of a wireless communication system to wirelessly communicate with a user equipment (UE), the base station being capable of transmitting over multiple antennas, the method comprising:
   determining whether the UE is located within a threshold edge distance from an edge of a cell corresponding to the base station, wherein the step of determining whether the UE is located within the threshold edge distance from the edge of the cell comprises:
      receiving a neighbor report from the UE regarding one or more other base stations neighboring the base station detected by the UE;
      determining a number of neighboring base stations based on the neighbor report;
      determining whether the number of neighboring base stations is higher than a threshold neighbors number;
      determining that the UE is located within the threshold edge distance when the number of neighboring base stations is determined to be higher than the threshold neighbors number; and
      determining that the UE is not located within the threshold edge distance when the number of neighboring base stations is not determined to be higher than the threshold neighbors number; and
   choosing diversity for transmission from the base station to the UE when the UE is determined to be located within the threshold edge distance.

2. The method of claim 1, further comprising choosing multiplexing for transmission from the base station to the UE when the UE is not determined to be located within the threshold edge distance.

3. The method of claim 1, wherein the step of determining whether the UE is located within the threshold edge distance from the edge of the cell comprises:
   receiving a radio link report from the UE regarding a radio link between the base station and the UE;
   determining a link quality of the radio link based on the radio link report;
   determining whether the link quality is lower than a threshold link quality;
   determining that the UE is located within the threshold edge distance when the link quality is determined to be is lower than the threshold link quality; and
   determining that the UE is not located within the threshold edge distance when the link quality is not determined to be lower than the threshold link quality.

4. The method of claim 3, wherein in the step of determining the link quality of the radio link, the link quality is determined based on any one or more of SINR, SNR, error rate(s), retransmission rate(s), and MCS.

5. The method of claim 1, wherein the step of determining whether the UE is located within the threshold edge distance from the edge of the cell comprises:
   measuring a UE signal level of a signal transmitted from the UE;
   determining the UE signal level is below a threshold UE level;
   determining that the UE is located within the threshold edge distance when the UE signal level is determined to be below the threshold UE level; and
   determining that the UE is not located within the threshold edge distance when the UE signal level is not determined to be below the threshold UE level.

6. The method of claim 5, wherein in the step of measuring the UE signal level of the signal transmitted from the UE is performed prior to the UE being instructed to adjust its transmission power.

7. The method of claim 5, further comprising instructing the UE to transmit the signal level at a predetermined power level prior to measuring the UE signal level.

8. The method of claim 1, further comprising adaptively choosing one of diversity and multiplexing for transmission from the base station to the UE when the UE is not determined to be located within the threshold edge distance, wherein the step of adaptively choosing one of diversity and multiplexing comprises:
   determining whether the UE is located within a threshold base station distance from the base station; and
   choosing multiplexing for transmission from the base station to the UE when the UE is determined to be located within the threshold base station distance.

9. The method of claim 8, wherein the step of adaptively choosing one of diversity and multiplexing further comprises choosing one of diversity and multiplexing based on spectral characteristics of a radio link between the base station to the UE when the UE is not determined to be located within the threshold base station distance.

10. A base station of a wireless communication system arranged to wirelessly communicate with a user equipment (UE), the base station being capable of transmitting over multiple antennas, the base station comprising:
   a communication unit configured to communicate with the UE, the communication unit being configured to receive a neighbor report from the UE regarding one or more other base stations neighboring the base station detected by the UE;
   a UE location determination unit configured to determine whether the UE is located within a threshold edge distance from an edge of a cell corresponding to the base station, the UE location determination unit is configured to:
      determine a number of neighboring base stations based on the neighbor report,
      determine whether the number of neighboring base stations is higher than a threshold neighbors number,
      determine that the UE is located within the threshold edge distance when the number of neighboring base stations is determined to be higher than the threshold neighbors number, and
      determine that the UE is not located within the threshold edge distance when the number of neighboring base stations is not determined to be higher than the threshold neighbors number; and
   a communication mode determination unit configured to choose diversity for transmission from the base station to the UE when the UE location determination unit determines that the UE is located within the threshold edge distance.

11. The base station of claim 10, wherein the communication mode determination unit is configured to choose multiplexing for transmission from the base station to the UE when the UE location determination unit determines that the UE is not located within the threshold edge distance.

12. The base station of claim 10,
wherein the communication unit is configured to receive a radio link report from the UE regarding a radio link between the base station and the UE, and
wherein the UE location determination unit is configured to:
determine a link quality of the radio link based on the radio link report,
determine whether the link quality is lower than a threshold link quality,
determine that the UE is located within the threshold edge distance when the link quality is determined to be lower than the threshold link quality, and
determine that the UE is not located within the threshold edge distance when the link quality is not determined to be lower than the threshold link quality.

13. The base station of claim 12, the UE location determination unit is configured to determine the link quality of the radio link based on any on or more of SINR, SNR, error rate(s), retransmission rate(s), and MCS.

14. The base station of claim 10,
wherein the communication unit is configured to measure UE signal level of a signal transmitted from the UE, and
wherein the UE location determination unit is configured to:
determine the UE signal level is below a threshold UE level,
determine that the UE is located within the threshold edge distance when the UE signal level is determined to be below the threshold UE level, and
determine that the UE is not located within the threshold edge distance when the UE signal level is not determined to be below the threshold UE level.

15. The base station of claim 14, wherein the communication unit is configured to measure UE signal level of the signal transmitted from the UE prior to instructing the UE to adjust its transmission power.

16. The base station of claim 14, wherein the communication unit is configured instruct the UE to transmit the signal level at a predetermined power level prior to measuring the UE signal level.

17. The base station of claim 10,
wherein UE location determination unit is configured to determine whether the UE is located within a threshold base station distance from the base station, and
wherein the communication mode determination unit is configured to choose multiplexing for transmission from the base station to the UE when the UE is determined to be located within the threshold base station distance.

18. The base station of claim 17, wherein the communication mode determination unit is configured to choose one of diversity and multiplexing based on spectral characteristics of a radio link between the base station to the UE when the UE is not determined to be located within the threshold base station distance.

* * * * *